(12) United States Patent
Wyseur

(10) Patent No.: US 12,081,648 B2
(45) Date of Patent: *Sep. 3, 2024

(54) BLOCK CRYPTOGRAPHIC METHOD FOR ENCRYPTING/DECRYPTING MESSAGES AND CRYPTOGRAPHIC DEVICES FOR IMPLEMENTING THIS METHOD

(71) Applicant: NAGRAVISION SARL, Cheseaux-sur-Lausanne (CH)

(72) Inventor: Brecht Wyseur, Penthalaz (CH)

(73) Assignee: NAGRAVISION SARL, Cheseaux-sur-Lausanne (CH)

( * ) Notice: Subject to any disclaimer, the term of this patent is extended or adjusted under 35 U.S.C. 154(b) by 36 days.

This patent is subject to a terminal disclaimer.

(21) Appl. No.: 17/858,115

(22) Filed: Jul. 6, 2022

(65) Prior Publication Data

US 2023/0041383 A1 Feb. 9, 2023

Related U.S. Application Data

(63) Continuation of application No. 15/532,932, filed as application No. PCT/EP2015/078115 on Dec. 1, 2015, now Pat. No. 11,418,321.

(30) Foreign Application Priority Data

Dec. 3, 2014 (EP) .................................... 14196089

(51) Int. Cl.
*H04L 9/06* (2006.01)
*G06F 21/60* (2013.01)
*H04L 9/32* (2006.01)

(52) U.S. Cl.
CPC .......... *H04L 9/0631* (2013.01); *G06F 21/602* (2013.01); *H04L 9/0637* (2013.01); *H04L 9/3242* (2013.01)

(58) Field of Classification Search
CPC ... H04L 9/0631; H04L 9/0637; H04L 9/3242; G06F 21/602; Y04S 40/20
See application file for complete search history.

(56) References Cited

U.S. PATENT DOCUMENTS 6,128,737 A * 10/2000 Jakubowski .......... H04L 9/3242
380/37
6,748,410 B1 * 6/2004 Gressel ................... G06F 7/728
708/491

(Continued)

OTHER PUBLICATIONS

Lucks, S. (2005). Two-pass authenticated encryption faster than generic composition. In Fast Software Encryption: 12th International Workshop, FSE 2005, Paris, France, Feb. 21-23, 2005, Revised Selected Papers 12 (pp. 284-298). Springer Berlin Heidelberg.*

(Continued)

*Primary Examiner* — David Garcia Cervetti
(74) *Attorney, Agent, or Firm* — POLSINELLI LLP

(57) ABSTRACT

A block cipher method and apparatus using round repetition for providing, from a plaintext message (10), a ciphertext message (50) and a global tag (52) is disclosed. The plaintext message is converted into a plurality of ordered plaintext blocks (11) which are successively processed during a round for computing:—a cryptogram (30) by encrypting input data (20) using a single cryptographic key, said cryptogram comprising a first segment (31) and a second segment (32)—a ciphertext block (51) by performing a first operation (41) using, as operands: said first segment (31) said current plaintext block (11) and said second segment (32). At each next round said input data is newly determined based on the current ciphertext block and an updated reproducible data. The ciphertext message is determined by concatenating the ciphertext blocks and the global tag by a second operation (42) using computed authentication local tags as operands.

20 Claims, 5 Drawing Sheets

(56) References Cited

U.S. PATENT DOCUMENTS

| | | | | |
|---|---|---|---|---|
| 6,948,067 B2* | 9/2005 | Hawkes | H04L 9/0643 | 380/42 |
| 6,950,517 B2* | 9/2005 | Hawkes | H04L 9/0643 | 713/168 |
| 7,450,717 B1* | 11/2008 | Sprunk | H04L 9/3247 | 380/42 |
| 7,623,656 B2* | 11/2009 | Hawkes | H04L 9/065 | 380/42 |
| 8,509,427 B2* | 8/2013 | Smith | H04L 9/0656 | 380/263 |
| 9,160,539 B1* | 10/2015 | Juels | G06F 21/554 | |
| 9,166,793 B2* | 10/2015 | Poovendran | H04L 9/3242 | |
| 9,497,021 B2* | 11/2016 | Murray | H04L 9/003 | |
| 9,537,657 B1* | 1/2017 | Char | H04L 9/0637 | |
| 9,571,270 B2* | 2/2017 | Shrimpton | G06F 12/1408 | |
| 9,577,822 B1* | 2/2017 | Pedersen | G06F 21/30 | |
| 9,787,475 B2* | 10/2017 | Minematsu | H04L 9/0643 | |
| 9,917,695 B2* | 3/2018 | Yamada | H04L 9/0637 | |
| 10,237,066 B1* | 3/2019 | Langhammer | H04L 9/0631 | |
| 2002/0048364 A1* | 4/2002 | Gligor | H04L 9/0637 | 380/37 |
| 2002/0071552 A1* | 6/2002 | Rogaway | H04L 9/3242 | 380/37 |
| 2004/0017913 A1* | 1/2004 | Hawkes | H04L 9/0637 | 380/37 |
| 2004/0019782 A1* | 1/2004 | Hawkes | H04L 9/3236 | 380/37 |
| 2004/0019783 A1* | 1/2004 | Hawkes | H04L 9/0637 | 380/37 |
| 2004/0019785 A1* | 1/2004 | Hawkes | H04L 9/0643 | 713/168 |
| 2005/0036618 A1* | 2/2005 | Gammel | G06F 21/72 | 380/255 |
| 2005/0149730 A1* | 7/2005 | Aissi | H04L 9/3247 | 713/168 |
| 2005/0188216 A1* | 8/2005 | Crispin | H04L 9/0637 | 713/190 |
| 2006/0126835 A1* | 6/2006 | Kim | H04L 9/3242 | 380/44 |
| 2006/0200514 A1* | 9/2006 | Fischer | G06F 21/755 | 708/446 |
| 2006/0285684 A1* | 12/2006 | Rogaway | H04L 9/0637 | 380/37 |
| 2007/0106896 A1* | 5/2007 | Sandberg | H04L 9/0643 | 713/170 |
| 2007/0237327 A1* | 10/2007 | Taylor | H04L 9/14 | 380/37 |
| 2008/0025496 A1* | 1/2008 | Smith | H04L 9/0637 | 380/28 |
| 2008/0084996 A1* | 4/2008 | Chen | H04L 9/0637 | 380/28 |
| 2008/0112561 A1* | 5/2008 | Kim | H04L 9/3242 | 380/42 |
| 2008/0165953 A1* | 7/2008 | Patel | G06F 21/606 | 726/2 |
| 2008/0172562 A1* | 7/2008 | Cachin | G06F 21/6218 | 711/E12.098 |
| 2008/0232591 A1* | 9/2008 | Jutla | H04L 9/0637 | 380/28 |
| 2008/0279368 A1* | 11/2008 | Yen | H04L 9/0637 | 708/492 |
| 2009/0080646 A1* | 3/2009 | Yen | H04L 9/3236 | 708/492 |
| 2009/0080647 A1* | 3/2009 | Mantin | H04L 9/0625 | 380/29 |
| 2009/0138710 A1* | 5/2009 | Minematsu | H04L 9/0631 | 713/170 |
| 2009/0262937 A1* | 10/2009 | Hirth | H04L 9/0891 | 380/256 |
| 2010/0027783 A1* | 2/2010 | Yup | H04L 9/0631 | 380/44 |
| 2010/0303229 A1* | 12/2010 | Unruh | H04L 9/0637 | 380/28 |
| 2011/0051927 A1* | 3/2011 | Murray | H04L 9/003 | 380/28 |
| 2011/0138192 A1* | 6/2011 | Kocher | H04L 9/003 | 713/189 |
| 2011/0191588 A1* | 8/2011 | Rogaway | H04L 9/3242 | 713/170 |
| 2012/0008767 A1* | 1/2012 | Smith | H04L 9/3273 | 380/28 |
| 2012/0076293 A1* | 3/2012 | Smith | H04L 9/0656 | 380/28 |
| 2012/0096273 A1* | 4/2012 | Campagna | H04L 9/3247 | 713/176 |
| 2012/0096274 A1* | 4/2012 | Campagna | H04L 9/3242 | 713/176 |
| 2012/0191984 A1* | 7/2012 | Ohyama | G06F 21/72 | 713/189 |
| 2013/0117824 A1* | 5/2013 | Naslund | H04L 9/321 | 726/4 |
| 2013/0159726 A1* | 6/2013 | McKeen | G06F 21/53 | 713/189 |
| 2013/0191637 A1* | 7/2013 | Smaak | H04L 9/3242 | 713/168 |
| 2013/0204791 A1* | 8/2013 | Dorsey | G06Q 20/3226 | 705/44 |
| 2013/0238900 A1* | 9/2013 | Leggette | G06F 9/5077 | 713/165 |
| 2013/0301827 A1* | 11/2013 | Mueller | H04L 9/0643 | 380/28 |
| 2014/0101445 A1* | 4/2014 | Giladi | H04L 63/0428 | 713/168 |
| 2014/0146964 A1* | 5/2014 | Yamada | H04L 9/0643 | 380/28 |
| 2014/0281587 A1* | 9/2014 | Ignatchenko | G06F 21/64 | 713/193 |
| 2014/0317407 A1* | 10/2014 | Minematsu | G06F 21/64 | 713/170 |
| 2015/0082399 A1* | 3/2015 | Wu | H04L 63/0838 | 726/10 |
| 2016/0006568 A1* | 1/2016 | Minematsu | H04L 9/3242 | 713/189 |
| 2016/0173276 A1* | 6/2016 | Minematsu | G09C 1/00 | 380/28 |
| 2017/0264426 A1* | 9/2017 | Joye | H04L 9/3247 | |
| 2017/0272239 A1* | 9/2017 | Minematsu | H04L 9/0618 | |

OTHER PUBLICATIONS

Li, X., Wang, P., Li, B., & Sun, Z. (Nov. 2013). Cryptanalysis of Three Authenticated Encryption Schemes for Wireless Sensor Networks. In International Conference on Information Security and Cryptology (pp. 395-406). Cham: Springer International Publishing.*

* cited by examiner

BLOCK CRYPTOGRAPHIC METHOD FOR ENCRYPTING/DECRYPTING MESSAGES AND CRYPTOGRAPHIC DEVICES FOR IMPLEMENTING THIS METHOD

TECHNICAL FIELD

The present invention relates to the field of message encryption, using a block cipher mode of operation for authenticated encryption (AE), and message decryption using reverse mode of operation. More specifically, this invention relates to Authenticated Encryption schemes and, in particular, it relates to an improvement of a so-called Counter Cipher FeedBack (CCFB) scheme. In a variant, this invention also comprises an extension to Authenticated Encryption schemes with Associated Data (AEAD), in particular, to an improvement of a CCFB+H scheme. Finally, this invention also relates to the reverse cryptographic operation using the same scheme.

BACKGROUND

When a sensitive message must be sent from a first entity to a second one, it is common to protect the privacy of the message and its integrity/authenticity. In the past, these two security goals had been handled separately, because it was considered that the integrity protection, typically handled by using message authentication codes (MACs) or digital signatures, was a goal that should be achieved by completely different means.

After observing that implementing a confidentiality mode with a separated authenticity mode could be difficult and error prone, it was suggested to supply modes of operation which combine both confidentiality and integrity/authenticity into a single cryptographic scheme. A mode of operation can be regarded as a technique for enhancing the effect of a cryptographic algorithm, in particular any algorithm based on a symmetric encryption scheme. Authenticated Encryption (AE) schemes are designed for simultaneously protecting the privacy and the integrity/authenticity of processed messages in a single compact mode of operation. As an example, when a provider wants to send sensitive information to a client, data privacy is required to ensure that information remains confidential. In addition, integrity and authenticity is further required to ensure that the entity which has sent the information is really the aforementioned provider and that the information was not modified during its transit.

AE modes can be classified according to the number of passes over the data it requires. Some AE modes use only one pass over the data, whereas others use two passes. Single-pass modes provide authenticated encryption just after single processing a message. Two-pass modes process data in two phases (still using one key for both encryption and authentication).

When a message is encrypted by means of such an "integrated" authenticated-encryption scheme, the ciphertext may be sent together with additional information. This means that one can append an unencrypted header to your encrypted message. Such a packet header (cleartext header bound to the plaintext message) needs to be authenticated together with the message, but it does not need to be encrypted. Indeed, typically in a network packet, the payload should be encrypted and authenticated, but the header should be only authenticated (i.e. it should remain unencrypted). The reason is that routers must be able to read the headers of packets in order to know how to properly route them. Some modes of operation are specifically suitable to efficiently authenticate data associated with the ciphertext message. Such modes are referred to as Authenticated Encryption with Associated Data (AEAD). They allow associated data to be included as input into their schemes.

One of the drawbacks of AE and AEAD schemes is that they are prone to first-order Differential Power Analysis (DPA) attacks. Power analysis is a form of side channel attack (non-invasive attack) in which the hacker studies the power consumption of a cryptographic device. Such a device can refers to a microprocessor card, a badge, a key, an integrated circuit chip of a printed circuit board, a security module within a descrambler module or can be functions implemented in a software form only. By studying the current and voltage input and output of a circuit (or device's timing or even electromagnetic emissions), it could be possible to discover secret information such as cryptographic keys used during normal device operations. Indeed, some operations require more power consumption. Thus, by using a digital oscilloscope and a conventional personal computer, analysis of variations and spikes can be drawn valuable information to the cryptanalyst.

Simple Power Analysis (SPA) recovers secret keys through direct observation of a device's power consumption, while DPA attacks employ statistical techniques to extract secret key information from multiple power consumption measurements. DPA is an advanced form of power analysis which allows to compute intermediate values within cryptographic computations by statistically analyzing data collected from multiple cryptographic operations, typically from thousands operations. DPA attacks have signal processing and error correction properties which are able to extract secrets from measurements containing too much noise to be analyzed using SPA. Using a DPA attack, a hacker can obtain secret keys by analyzing power consumption measurements from multiple cryptographic operations performed onto a vulnerable cryptosystems.

To address such side channel attacks, countermeasures were developed. Some of these countermeasures involve modifications of the cryptographic algorithm, for instance by performing cryptographic operations on data that is related to the actual value by mathematical relationship that survives the cryptographic operation. One approach involves blinding parameters to randomize data manipulated by the cryptosystem while still producing the correct result. Unpredictable information is incorporated into intermediate values to reduce correlation between power consumption measurements (side channels) and the original intermediate values. According to another approach, it is possible to mask the original signal by intentionally reducing the amplitude of the signal to decrease the signal-to-noise ratio (S/N). In a variant, one can also add amplitude or temporal noise into the power consumption measurements to decrease the S/N ratio. Other countermeasures may involve hardware modifications, e.g. by varying internal clock frequency of a chip in order to desynchronize electric signals, or may involve cryptographic protocol modifications, e.g. by continually refreshing and updating secrets during the lifetime of the cryptosystem.

However, preventing DPA attacks is very challenging, since even small variations in the power consumption can lead to exploitable weaknesses. In addition, there is often no free access to such countermeasures due to protection conferred by patents. Accordingly, there is a need to provide a new AE scheme in order to overcome at least partially these drawbacks.

SUMMARY OF THE INVENTION

Instead of providing new countermeasures to protect cryptosystems against DPA attacks, the present invention suggests an improved mode of operation, while keeping DPA attacks in mind. To this end, the present invention refers to a mode of operation, based on the CCFB scheme, which is better suited to mitigate DPA attacks. More particularly, the present invention suggests a block cipher method using round repetition for providing, from a plaintext message, a ciphertext message and a global tag for authenticating said ciphertext message. The plaintext message is converted (in particular dividing and padding if any) into a plurality of ordered plaintext blocks having all the same bit length. Each of these plaintext blocks is successively processed in an orderly manner as a current plaintext block during a round. The method comprising the following actions:

loading a first data into a register,
running the round by performing the following steps:
a first step for inputting input data into a block cipher algorithm, such input data comprising data of the register and a reproducible data, e.g. a counter data or any other reproducible data series,
a second step for computing, within the block cipher algorithm, a cryptogram by encrypting the input data using a single cryptographic key, this cryptogram comprises a first segment and a second segment, the latter being defined as an authentication local tag,
a third step for computing a ciphertext block by performing a first operation using as operands: the first segment, the current plaintext block, and the second segment,
as long as all the aforementioned plaintext blocks have not been processed in such a round, reloading the register with the last computed ciphertext block and applying an updating function, e.g. an incrementing function, to the reproducible data before running a new round by starting again to said first step,
determining the ciphertext message by concatenating the ciphertext blocks provided by all the rounds in an orderly manner, preferably in the aforementioned orderly manner, then
reloading the register with the last computed ciphertext block and applying the updating function to the reproducible data before performing only the first two steps of the round, then
computing the global tag by a second operation using all the computed authentication local tags as operands.

From the above method, it should be noted that the new mode of operation of the present invention is based on a Counter Cipher FeedBack (CCFB) scheme. Strictly speaking, the CCFB scheme is a two-pass AE scheme whose structure strongly resembles that of one-pass solutions. The disclosed innovative method preferably adopts an unusual combination of two modes of operation, namely a counter mode (CTR) and a Cipher Feedback (CFB) mode, for providing both encryption and authentication. According to this embodiment, an authentication local tag, which results from the computation of the second segment of the cryptogram, is not only used for computing a global tag during the second pass, but it is advantageously also used during the first pass for computing each ciphertext block. Thus, it is proposed that improvements to the operation of secure computing systems, including but not limited to resistance to known attacks, can be achieved.

Additional embodiments describe devices for implementing the above-mentioned methods. Preferably, one of these devices is especially dedicated to encrypt message, whereas the other device is dedicated to the reverse process. Given that they comprise the same components, both of these devices are very similar and will be described in more details in the following detailed description.

The aim and the advantages of the present invention are achieved thanks to the cryptographic method consistent with the subject-matter of independent method claims and thanks to the devices consistent with the subject-matter of the other independent device claims.

Other advantages and embodiments will be presented in the following detailed description.

BRIEF DESCRIPTION OF THE DRAWINGS

The present invention will be better understood thanks to the attached figures in which.

DETAILED DESCRIPTION

Figure 1:
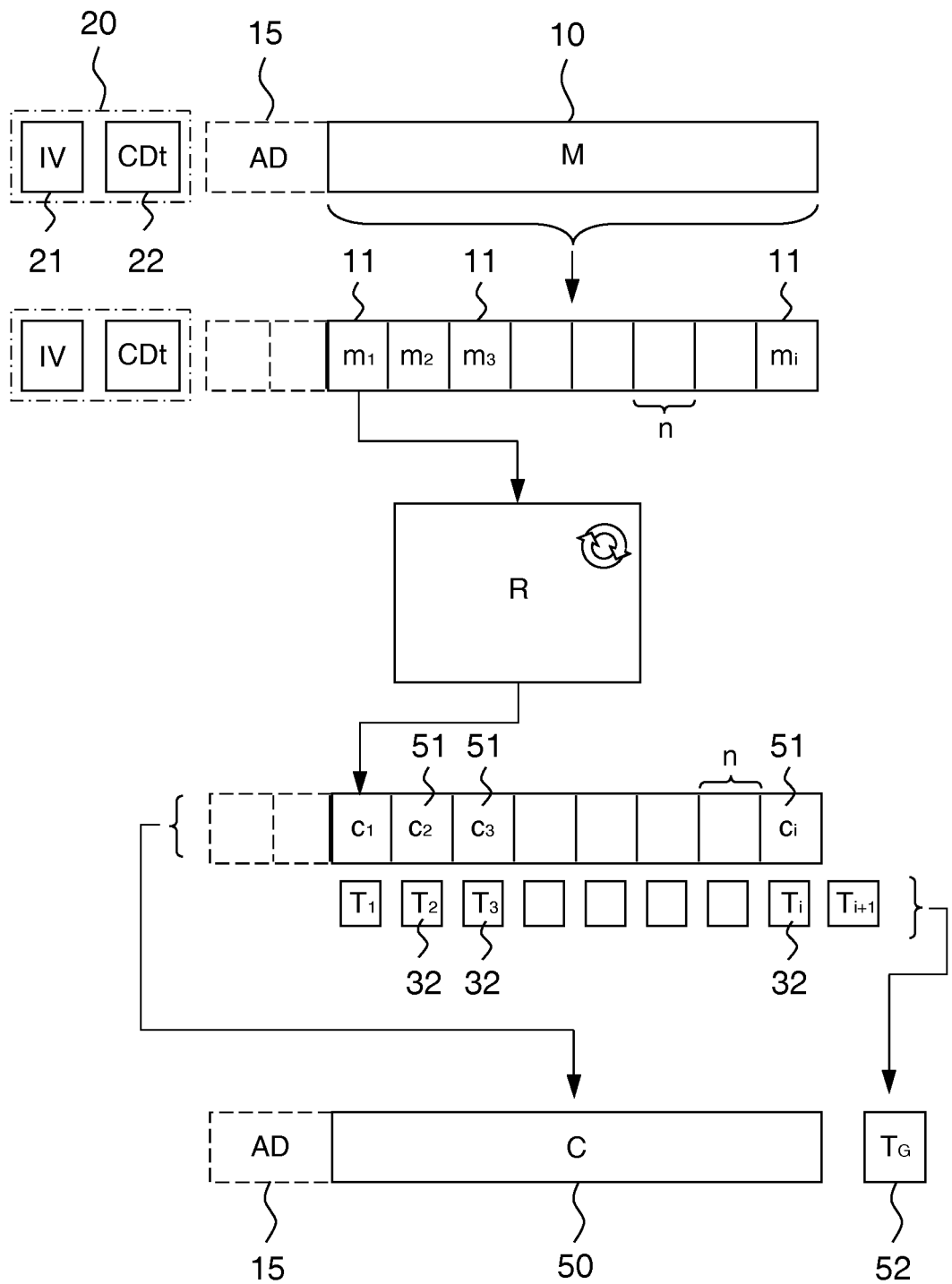
FIG. 1 schematically depicts the converting process of a plaintext message into a ciphertext message.

Referring to FIG. 1, the latter schematically shows a plaintext message (M) 10 processed by the present invention with additional input data 20, the main converting steps of this plaintext message 10 with said input data 20, and a ciphertext message (C) 50 output from the process with complementary data 52. Optionally, the plaintext message 10 can be provided with an associated data (AD) 15 which can typically relate to a header of the plaintext message 10.

According to a preferred embodiment, the aforementioned input data 20 comprises a first data 21, for instance an initialization vector (IV), and a reproducible data 22 that can be initialized (reset) to any default value. This reproducible data is preferably a counter data (CDt), namely a data such as a value provided by a counter. However, as there is no requirement to limit such data to data provided by a counter in the strict sense, it is referred to the so-called reproducible data. The word "reproducible" excludes any random data unless they have been predefined before to be used. Therefore, it should be understood that the aforementioned reproducible data refers to any data such as a value that can be reproduced thanks to a reproducible process or function which can be regarded as an updating function or a renewal function. For example, such a process or function may relate to a hash function or to an incrementing or decrementing function applied to an initial value. It may also refer to a predefined list or series of random or pseudo-random numbers successively taken, in a certain order, as reproducible data. Preferably, all of these numbers will be different in order to avoid any repetition. In the present description, the expression "counter data" is used according to a preferred embodiment, namely as non-limiting example. The complementary data 52 relates to a tag, in particular to a global tag ($T_G$) which is determined from a plurality of local tags, as further explained hereafter. The global tag 52 is used as an authentication data for authenticating the ciphertext message 50 at the end of the process.

As shown in FIG. 1, the plaintext message 10 is converted into a plurality of plaintext blocks ($m_1, m_2, m_3, \ldots m_i$). In this Figure, each of these plaintext blocks is identified by the common reference numeral 11. The converting process used to convert the plaintext block message 10 into a plurality of plaintext blocks 11 mainly intends to divide the plaintext message 10 into blocks having the same bit length. In the case where the plaintext message 10 has a bit length which is not a multiple of the bit number of the plaintext blocks, the converting process will further comprise a step for padding at least one of the two end plaintext blocks, (e.g. the last plaintext block and/or the first one) with at least one default bit (e.g. with a bit equal to zero). The aim of the padding step is to provide the end block with the same bit length as the other blocks.

The plaintext blocks 11 have to be processed in a specific order, so that the same order can be applied during the reverse process aiming to decrypt the ciphertext message. Accordingly, the plaintext blocks 11 are arranged in an orderly manner. Alternatively, each block is assigned with an identifiable position in order to determine such a specific order. Thanks to the order of these blocks, it will be possible to rebuild the plaintext message 10 from the ciphertext message 50. Preferably, when the plaintext message 10 is divided into blocks 11, the latter are not mixed together, but the order in which they have been divided is kept. Keeping such an order can be achieved, e.g. by storing in a record both the content of the block and is position within the message 10. In a variant, an index could be associated to the content of each block, so as it can be possible to retrieve the appropriate position of any block $m_1, m_2, m_3, \ldots m_i$ thanks to its index $1, 2, 3, \ldots i$.

Then, each of these plaintext blocks 11 is successively processed, as a so-called current plaintext block, in such an orderly manner during a round R of the method. At the end of each round, a ciphertext block 51 is obtained in correspondence of the current plaintext block 11. For instance, the plaintext block $m_1$ shown in FIG. 1 provides the ciphertext block $c_1$ at the output of the round.

Each round also provides a tag, in particular a local tag 32 in correspondence with the related ciphertext block 51 output by the same round. The set of iterations which allow to compute the ciphertext blocks 51 constitutes a first pass of the method. In one embodiment, the second pass aims to determine the global tag 52 by using all local tags 32 which have been computed.

The ciphertext message 50 is obtained by combining all the ciphertext blocks 51 together, in particular by concatenating them so as to form a chain in accordance with the aforementioned orderly manner, so as to keep respective positions between the blocks 11 within the plaintext message 10 and the correspondent blocks 51 within the ciphertext message 50. Given that the associated data 15 can typically be the header of the message 10, therefore it remains unencrypted and it is merely appended to the ciphertext message 50. At the end of the process, the ciphertext message 50, its associated data 15 (if any) and the global tag 52 form together three united related entities.

Figure 2:
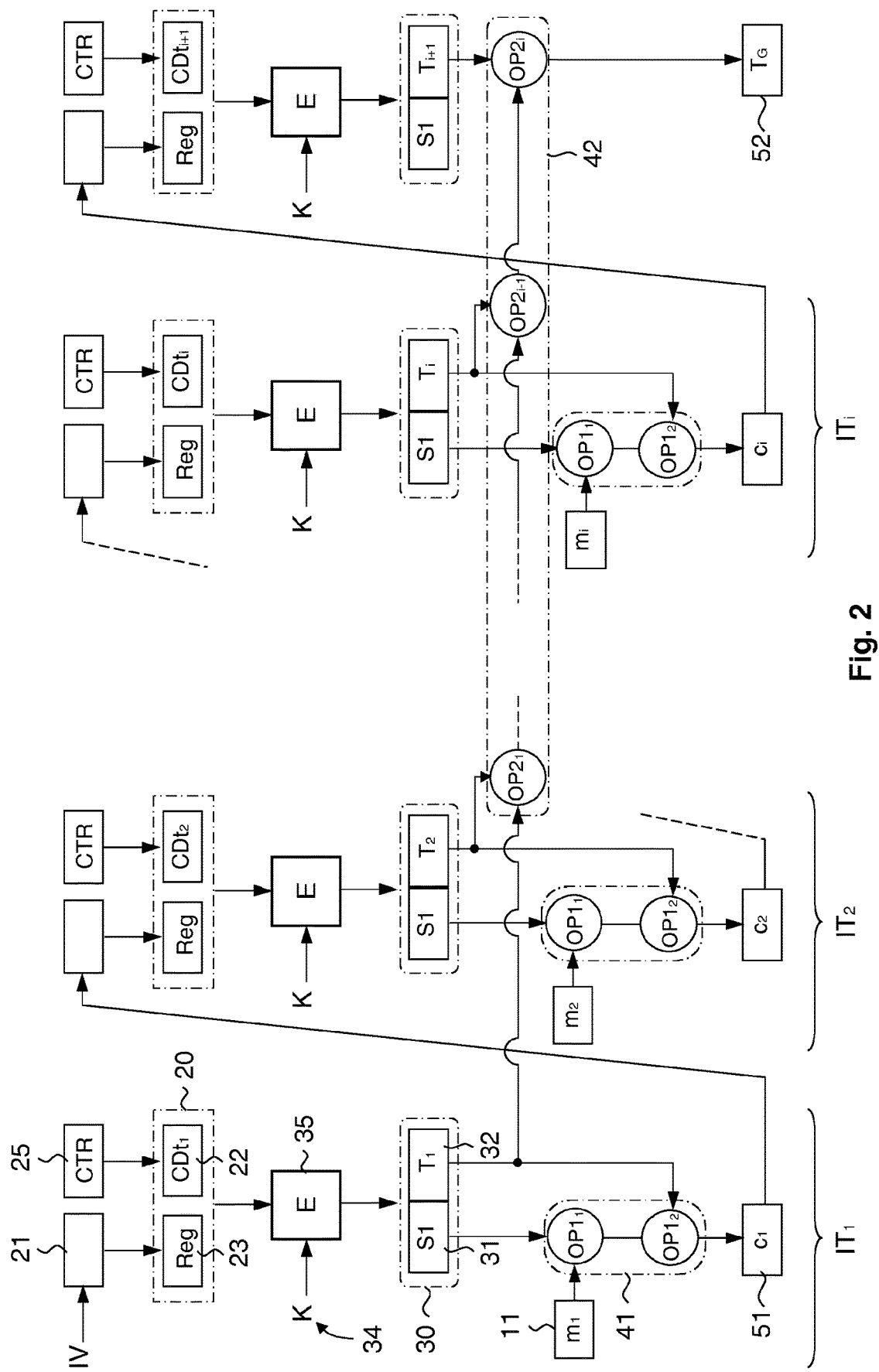
FIG. 2 is a flowchart showing an exemplary embodiment of the cryptographic method of the present invention, more particularly of the encryption phase.

A preferred method implementing the present invention will be now explained in more details thanks to FIG. 2 which shows, through a plurality of iterations ($IT_1, IT_2, IT_3, \ldots IT_i$), the actions and steps undertaken during the encryption phase. Each of these iterations provides one ciphertext block 51 at the end of a set of steps and actions.

The first action is to load a first data 21 into a register 23. Preferably and as shown in the embodiment depicted in FIG. 2, the first data 21 of the first iteration $IT_1$ is an initialization vector IV which can be generated by any random or pseudo-random generator. The next action intends to run the round of the method by performing the following three main steps.

The first step of the round is used for inputting input data 20 into a block cipher algorithm (E) 35. This algorithm is a generic block encryption scheme that can refer to DES, IDEA, AES, or to any other block cipher algorithm. Input data 20 comprises data loaded into the register 23, namely the first data 21 and a counter data ($CDt_i$) 22. Counter data 22 refers to a value provided by a counter (CTR) 25. This counter can be regarded as an updater (i.e. a unit for updating) since it is updated, namely incremented (or decremented), each time a new iteration $IT_n$ is undertaken. Accordingly, each round starts with a new counter data ($CDt_1, CDt_2, \ldots CDt_i, CDt_{i+1}$). The counter data is thus used as a so-called "nonce", namely as a "number used once". Indeed, each value provided by the counter is unique across all the processed blocks 11.

During the second step of the round a cryptogram 30 is computed then output from the block cipher algorithm 35 by encrypting the input data 20 using a single cryptographic key (K) 34. This cryptogram 30 comprises a first segment (51) 31 and a second segment 32. The latter is defined as being an authentication tag ($T_n$), in particular as being the local tag that authenticates the first segment 31. Preferably, the local tag 32 is stored in a memory, either until the global tag 52 has been calculated, or at least temporarily until an intermediate calculation is performed with the next local tag 32 of the next round, in the case where the global tag is determined progressively during each iteration.

The third step of the round is devoted to compute the ciphertext block 51 of the current plaintext block 11. To this end, the ciphertext block 51 is determined by performing a first operation 41 using as operands: the first segment 31, the current plaintext block 11 and the local tag 32. Therefore, the ciphertext block 51 is the result of an operation performed onto three data.

Given that this first operation 41 uses three operands, it is therefore performed in two steps, namely by performing a first sub-operation $OP1_1$ using a first operator and then by performing a second sub-operation $OP1_2$ using a second operator. Typically, the two sub-operations $OP1_1$, $OP1_2$ are logical operations (Boolean algebra), typically commutative operations. Still preferably, at least one of the operators is an exclusive OR operation (XOR operation).

Besides, owing to the commutative property of the XOR sub-operations, it should be noted that the three operands can be processed in any order within the first operation 41. As shown as example in FIG. 1, the current plaintext block 11 is processed with the first segment 31 by the first sub-operation $OP1_1$ and then the result of this first sub-operation is processed with the local tag 32 by the second sub-operation $OP1_2$. As a result, the second sub-operation $OP1_2$ provides the ciphertext block 51 and terminates the first iteration $IT_1$.

Instead of using a Boolean operation, such as an XOR operation, it should be noted that the second sub-operation $OP1_2$ could be based on any other function that is able to mix distributions of the two operands used as inputs, such that when one of these two operands is unknown, it is not possible to compute the other operand for a given cipher block 51 (i.e. for a given output). Nevertheless, the function must obviously remain reversible; otherwise the decryption would be not feasible. For instance, if a modular addition is used as operation during the encryption phase, then a modular subtraction will be used instead of the modular addition during the decryption phase. Therefore, the operations performed during the decryption phase will be the inverse of those performed during the encryption phase.

Although XOR operation remains the most natural choice, it should be noted that modular addition or modular multiplication could be also used to perform such operations during the encryption phase if modular subtraction or respectively modular division is used for the decryption phase. However, such modular operations are less suitable because they may release information (e.g. the carry-bit in modular addition) that could be used by other side-channel attacks.

As long as all the plaintext blocks 11 have not been fully processed, the register 23 is then reloaded with the ciphertext block 51 (i.e. with the current—or last computed— ciphertext block 51, as shown in FIG. 2) and an updating function, e.g. an incrementing function, is applied to the counter data 22 before running a new round (i.e. before starting again to the first step of the above-mentioned round). Accordingly, the first data 21 of the second iteration $IT_2$ will correspond to the ciphertext block 51 issued from the first iteration and the counter data $CDt_2$ of the second iteration will correspond to the result of the incrementing function applied to the counter data $CDT_1$ of the first iteration $IT_1$. In the present description, the expression "incrementing function" will be used as a preferred embodiment of the "updating function". Therefore, it should be understood that the "incrementing function" could be replaced by any "updating function". Similarly, the counter 25 mentioned in the present description could be also regarded as an "updater" as already mentioned above.

When all the plaintext blocks 11 have been processed, the register 23 is reloaded with the last computed ciphertext block 51 and the incrementing function of the counter is applied to the (current) counter data CDTi, as for the previous iterations. However, only the two first steps of the round are then performed in order to get the cryptogram 30 from the input data 20 (i.e. from $c_i$ and $CDt_{i+1}$) which is processed within the block cipher algorithm 35 using the cryptographic key 34. Accordingly, these actions does not refers to a complete iteration (as those done before), but should be rather regarded as being a partial iteration. From this last cryptogram 30, the local tag $(T_{i+1})$ 32 is then used to compute the global tag 52 by a second operation (OP2) 42 using all the computed local tags, namely all local tags computed since the first iteration $IT_1$. It should be noted that only the local tag (second segment 32) of this partial iteration is used. Therefore, the determination of the first segment 31 remains optional, but is implicitly done through the calculation of the cryptogram 30 which is processed as a single data.

The result of the second operation (OP2) provides the global tag 52. This result is calculated in a similar way as for determining the result of the first operation (OP1), namely by a plurality of sub-operations ($OP2_1$ to $OP2_j$). Preferably, each sub-operation uses as operands the local tag $T_n$ of the related iteration $IT_n$ and the result of the previous sub-operation determined in the previous iteration $IT_{n-1}$. The nature (i.e. the kind) of the second operation OP2 is similar or identical to that of the first operation OP1. The same is true regarding the order in which the operands are used to determine the global tag 52. The determination of the global tag 52 from all local tags corresponds to the second pass of the mode of operation.

The ciphertext message 50 is determined by combining (concatenating) all the ciphertext blocks 51 together, in a specific order that will be reused to recover the plaintext message 10 from the ciphertext message 50 during a reverse process that will be described hereafter. For instance, such an order can be the same as that in which the plaintext blocks 11 have been processed. In a variant, an index could be assigned to each ciphertext blocks 51 in order to identify the order in which these blocks have been processed.

Advantageously, by performing the first operation OP1 by using three operands instead of two, the ciphertext block 51 does not result from a single operation, but it results from two successive operations, namely the first sub-operation $OP1_1$, and the second sub-operation $OP1_2$. The first sub-operation uses two of the three operands as inputs, and the second sub-operation uses as inputs the third operand and the result of the first sub-operation. An attacker aiming to perform DPA attacks onto such a process by running the block cipher algorithm over many inputs (e.g. 100'000 times to observe 100'000 power traces) will have no access to the intermediate output determined on the basis of the first two operands. Instead he can only observe the output provided after the second sub-operation $OP1_2$. Accordingly, he will first need to attack the second sub-operation before being able to analyze the first sub-operation $OP1_1$. However, the second sub-operation is based on two unknown values; both uniformly distributed and uncorrelated. As a result the DPA does not work, or it will be at least much more difficult to apply such an attack on the subject-matter of the present invention than on one of the processes of the prior art.

According to one embodiment, the method further comprises a preliminary step for restoring a common bit length between the first data 21 (i.e. data loaded within the register 23) and the counter data 22. This preliminary step is performed in the case where first data 21 and counter data 22 do not have the same bit length. Preferably, this preliminary step is undertaken before inputting said input data 20 into the block cipher algorithm 35 or within the algorithm 35 itself. Preferably, the first segment 31 and the local tag 32 have the same bit length. If not, the method may further comprise an additional step (padding step) to restore the same bit length between these two segments. Still preferably, the first data 21 (e.g. IV), the counter data 22, the first segment 31 and the second segment 32 (local tag) all have the same bit length, namely the half bit length of the input data 20.

Figure 3:
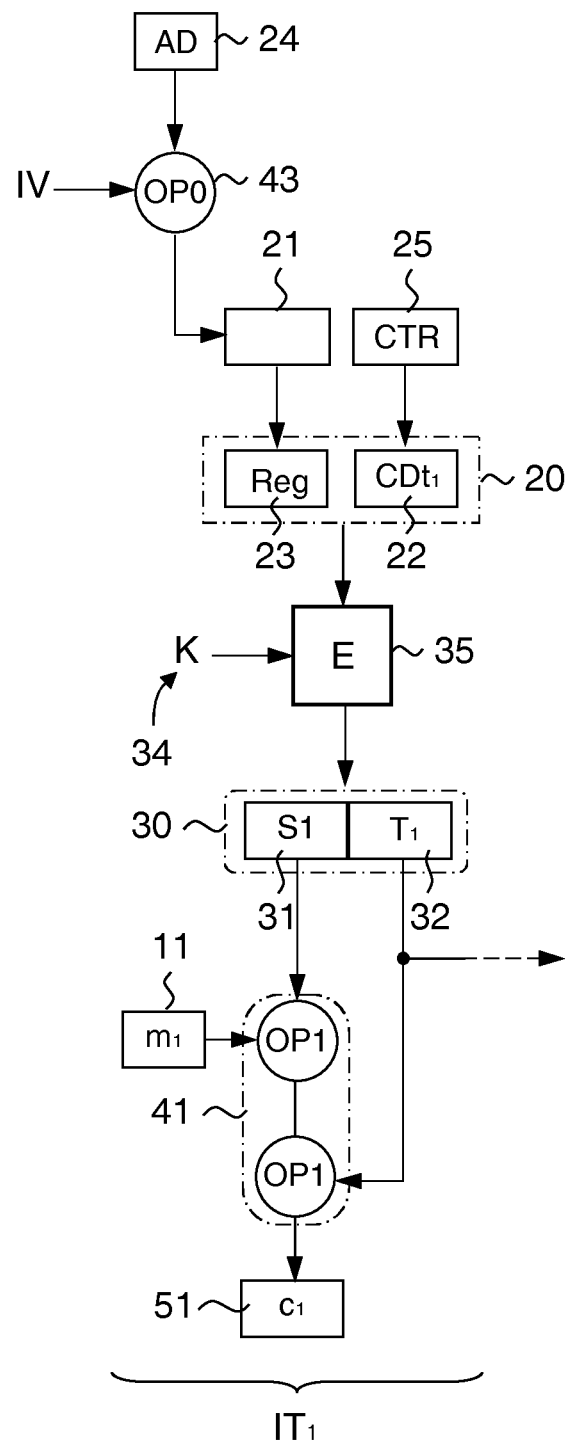
FIG. 3 shows another embodiment according to a partial illustration of the method based on FIG. 2.

According to one embodiment shown in FIG. 3, first data 21 may be the result of an initial operation (OP0) 43 using a plain text associated data (AD) 24 as an operand. As shown as example in this Figure, an initialization vector IV may be used as second operand of the initial operation 43. The associated data 24 typically may relate to a header of the plaintext message 10. In this case, it should be understood that the header (i.e. the associated data) is not processed in the same way as the message itself, but it remains an appendix of the message. The nature of the initial operation OP0 is similar or identical to that of the first operation OP1 or to that of the second operation OP2. Usually, the associated data is added to the initialization vector.

Figure 4:
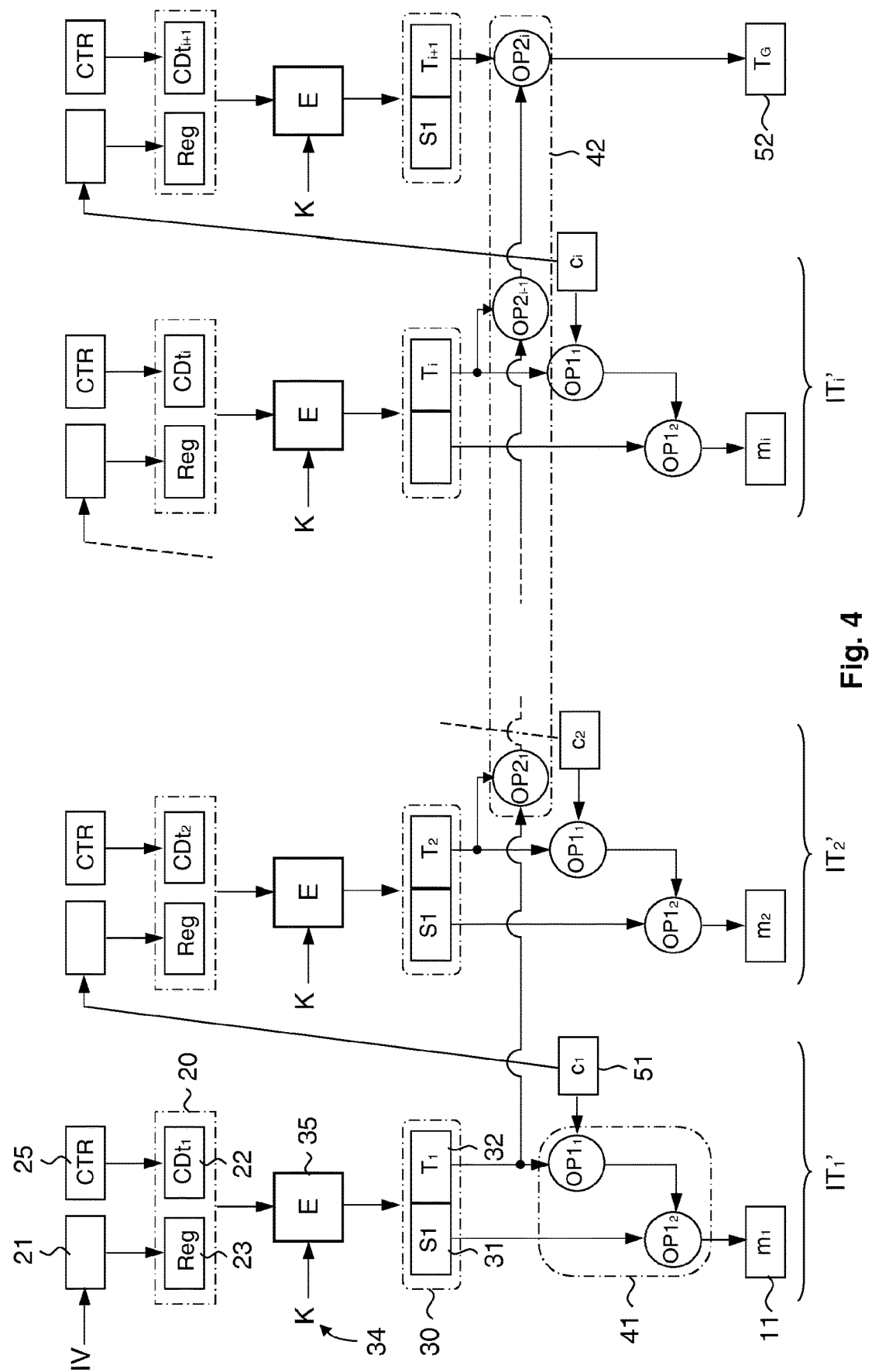
FIG. 4 is fully similar to FIG. 2, but relates to the decryption phase.

Referring to FIG. 4, it shows the decryption phase of the ciphertext message 50 obtained in accordance with the encryption phase shown in FIG. 2. Given that the mode of operation for ciphering a plaintext message 10 (FIG. 2)

relates to a reversible encryption process, the decipherment method shown in FIG. 4 is very similar to the cipher method of FIG. 2.

More specifically, FIG. 4 depicts a block decipherment method using round repetition for providing, from a ciphertext message 50, a plaintext message 10 and a global tag 52 for authenticating said plaintext message. The ciphertext message 50 being converted into a plurality of ordered ciphertext blocks 51; all of them having a same bit length (such an operation is not shown in FIG. 4 but is similar to that shown in FIG. 1). More particularly, this bit length is the same as that which has been defined for obtaining plaintext blocks 11 from the plaintext message 10 which was at the origin of this ciphertext message 50 during the encryption phase (FIG. 2). As explained regarding the encryption phase, if any, a padding step could be also applied to the end blocks (first or last block, depending on the block which has been padded during the related encryption phase). Each of the ciphertext blocks 51 being successively processed in an orderly manner as a current ciphertext block during a round. In particular, this orderly manner allows to keep respective positions between the blocks 11 within the plaintext message 10 and the correspondent blocks 51 within the ciphertext message 50.

Generally speaking, the same actions as those performed during the encryption phase are undertaken, namely loading a first data 21 into the register 23, then running the round by performing the following steps:

A first step for inputting input data 20 into a block decipherment algorithm 35, this input data comprising data loaded in the register 23 and a counter data 22.

A second step for computing, within the block decipherment algorithm 35, a first output 30 by decrypting input data 20 using the single cryptographic key 34 (i.e. the same key K as that used for the encryption phase). This first output 30 comprises a first segment 31 and a second segment 32, the latter being defined as an authentication local tag.

A third step for computing a plaintext block 11 by performing a first operation (OP1) 41 using as operands: the first segment 31, the current ciphertext block 51 and the second segment 32 (i.e. the local tag provided by the current iteration). Accordingly, the plaintext block 11 is the result of an operation performed onto three data. Given that this first operation 41 uses three operands, it is therefore performed in two steps as already explained regarding the encryption phase.

It should be noted that the operation (OP1) 41 performed during the decipherment phase (FIG. 4) is the inverse of the operation (OP1) 41 performed during the encryption phase (FIG. 2). In addition, since each of these operations 41 comprises two successive sub-operations, namely first $OP1_1$ and then $OP1_2$, it should be understood that the first sub-operation $OP1_1$ performed during the decryption phase corresponds to the inverse of the second sub-operation $OP1_2$ performed in the encryption phase. Similarly, the second sub-operation $OP1_2$ performed during the decryption phase corresponds to the inverse of the sub-operation $OP1_1$ performed first during the decryption phase.

As long as all the ciphertext blocks 51 have not been fully processed, the register is reloaded during a next iteration with the current ciphertext block 51 (i.e. with the last computed ciphertext block 51, as shown in FIG. 4) and an incrementing function is applied, by the counter 25, onto the counter data of the previous iteration in order to get a new counter data 22. This new counter data 22 will be used when running the new round, in the current new iteration, by starting again to the first step of the present decipherment method. In particular, the incrementing function is the same function as that used during the encryption phase. In addition, the first counter data ($CDt_1$) used as starting value (i.e. by the first iteration $IT_1'$) during the decryption phase is the same as that used as starting value (by the first iteration $IT_1$) during the encryption phase. For this reason, the first counter data ($CDt_1$) of the encryption phase could be transmitted to decryption device that is in charge of decrypting the ciphertext message 50. Typically, such a counter data ($CDt_1$) could be transmitted together with the ciphertext message 50, for instance in the (unencrypted) header of the ciphertext message 50. Furthermore, this counter data ($CDt_1$) could be also stored within the encryption device, at least temporarily in case where this data should be resent to the decryption device for any reason (e.g. for resynchronization purpose between the sender and the receiver). The same is true regarding the first data 21 (IV). According to another way, the initial counter data ($CDt_1$) could be also set to a default value (e.g. it could be set to 1) so that it does not need to be communicated. Indeed, the same first data 21 has to be loaded within the register during the first iterations $IT_1$ and $IT_1'$. Accordingly, the first data 21 (IV) could be also transmitted by the same way as for the first counter data and could be also stored within the encryption device for the same reason or could be set to a default value without the need to be communicated. In a variant, the first counter data ($CDt_1$), the first data 21 (IV) and other data that may vary such as the cryptographic key 34 (K) and/or the incrementing function of the counter 25 could be shared, at least once, between the encryption device and the decryption device during an initialization phase. Such an initialization phase could be also replayed later, for instance to reset the system or to update it.

The plaintext message 10 is determined by combining (concatenating) the plaintext blocks 11 obtained during all the rounds in the same order, as mentioned above, so as to retrieve the plaintext message that was originally used during the encryption phase to provide the ciphertext message 50.

Then, the register 23 is reloaded with the current ciphertext block 51 (i.e. with the last ciphertext block 51 which has been processed during the last iteration $IT_1'$) and the incrementing function is applied one more time onto the last counter data 22 before performing only the first two steps of the round (similarly to what was performed during the encryption phase when referring to the partial iteration). From this last first output 30, the local tag ($T_{i+1}$) 32 is then used to compute the global tag 52 ($T_G$) by a second operation (OP2) 42 that uses all the computed authentication local tags 32 as operands. As already explained regarding the encryption phase, the global tag 52 resulting from the second operation OP2 is calculated in a similar manner as for determining the result of the first operation (OP1), namely by a plurality of sub-operations ($OP2_1$ to $OP2_1$). The same kind of operations and variants as those mentioned during the encryption phase can be applied during the decryption phase.

Regardless the encryption or the decryption phase, it should be noted that the sub-operations ($OP2_1$ to $OP2_1$) are not necessarily computed once all the blocks 11, 51 have been processed. Indeed, these sub-operations could be progressively computed, one by one during each iteration, by determining an intermediate result. This intermediate result could be stored in a memory until it is processed as an operand with the next local tag (second operand) provided by the next iteration (or partial iteration at the end of the process). The same principle could be applied for determining the message 10, 50, from the respective blocks 11, 51.

Besides, due to the reverse property of the algorithm 35, it should be noted that the block cipher algorithm mentioned in the encryption phase is the same as the block decipherment algorithm of the decryption phase. Furthermore, it should be noted that the result provided by the algorithm 35 is defined as being a so-called "first output" 30 in the decryption phase. This wording has chosen instead of the word cryptogram, because this output should be rather regarded as being decrypted data (although, technically speaking, the algorithm 35 does not make any difference between the so-called first output and the so-called cryptogram).

According to one embodiment, the block decipherment method further comprises a preliminary step for restoring a common bit length between the first data 21 loaded in the register 23 and the counter data 22. This preliminary step will be used in the case first data 21 and counter data 22 do not have the same bit length. Such a preliminary step will be undertaken before inputting the input data 20 into the block cipher algorithm 35.

As already mentioned with respect to the encryption phase, the first data 21 can be an initialization vector IV, in particular a single block having the same bit length as that of the counter data 22.

According to one embodiment and similarly to what is shown in FIG. 3, the first data 21 could be the result of an initial operation OP0 using a plaintext associated data 24 as an operand. Preferably, this initial operation OP0 and the first and second operation OP1, OP2 are logical exclusive OR operations. However and as mentioned before, other kind of operations could be also used.

In addition, it should be noted that the ciphertext message 50 of the present decipherment method can be further associated with an authentication data (in particular the global tag obtained during the encryption phase by a related block cipher method). In such a case, the present decipherment method could further comprise a step for checking whether this associated authentication data is identical to the global tag 52 determined by the second pass of the decipherment method. If the global tag 52 is not identical to the authentication data associated with the ciphertext message 50, the latter will be declared as being not authentic.

Although the encryption phase and the decryption phase have been respectively presented as an encryption method and as a decryption method, the present invention could be also refer to a single method comprising both the encryption phase and the decryption phase.

Figure 5:
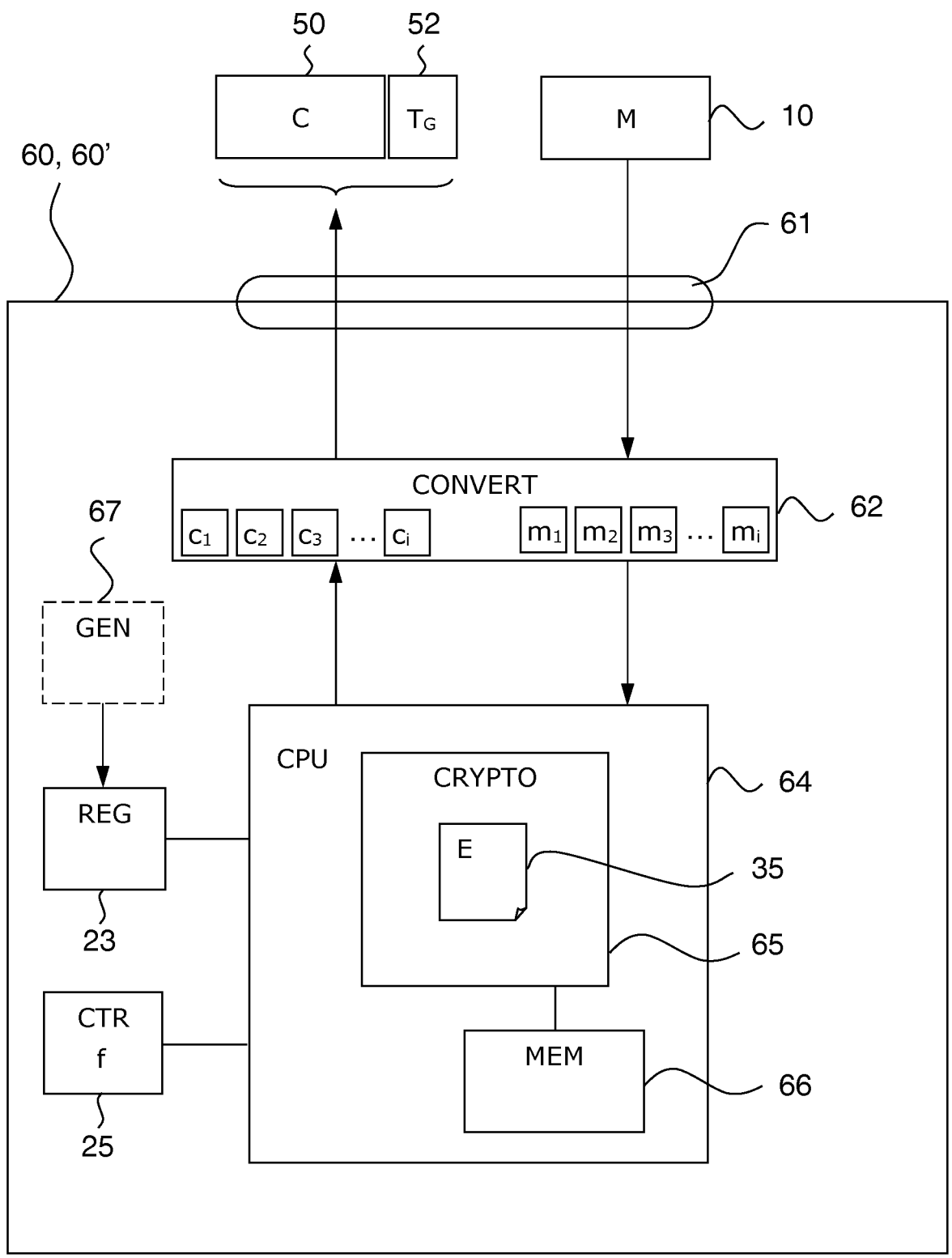
FIG. 5 shows an embodiment of a device for implementing any embodiment of the cryptographic method of the present invention, in particular for implementing any phase (encryption or decryption) of this method.

The invention also refers to a cryptographic device 60, 60' for implementing one of the methods or embodiments disclosed in the present description. Referring to FIGS. 1, 2 and 5, the first cryptographic device 60 is dedicated to the implementation of a block cipher method using round repetition for providing, from a plaintext message 10, a ciphertext message 50 and a global tag 52 for authenticating the ciphertext message. To this end, the cryptographic device 60 comprises the following components:

a register 23, typically in the form of a memory (e.g. a memory cell), for receiving first data 21, an updater 25 for updating a reproducible data 22 according to an updating function f; for example, it may refer to a counter 25 for incrementing counter data 22 according to an incrementing function (f), an interface 61 for receiving at least the plaintext message 10, a converting unit 62 for converting and preferably storing the plaintext message 10 into a plurality of ordered plaintext blocks 11 ($m_1, m_2, \ldots m_i$) having all the same bit length, a processing unit 64 for successively processing each of the plaintext blocks 11 in an orderly manner as a current plaintext block during a round, the processing unit further comprising a cryptographic unit 65, hosting a block cipher algorithm 35, and a memory 66 comprising a single cryptographic key 34 (K).

Each round comprises:

a first step for inputting (e.g. through the processing unit 64 as shown in FIG. 5) input data 20 into the block cipher algorithm 35, this input data 20 comprising data 21 of the register 23 and a reproducible data (counter data 22), a second step for computing, within the block cipher algorithm 35, a cryptogram 30 by encrypting the input data 20 using the single cryptographic key 34; the cryptogram 30 comprising a first segment 31 and a second segment 32, the latter being defined as an authentication local tag and being stored in a memory, for instance in the memory 66 which can be located within or without the processing unit 64, a third step for computing and storing, e.g. in such a memory 66, a ciphertext block 51 by performing a first operation OP1 using, as operands, the first segment 31, the current plaintext block 11 and the second segment 32 (i.e. the local tag).

As long as all the plaintext blocks 11 have not been fully processed, the processing unit 64 being further configured to reload the register 23 with the current ciphertext block 51 (i.e. the last computed ciphertext block 51) and to increment the counter data 22 (i.e. to update the reproducible data) before running a new round by starting again to the first step.

The converting unit 62 being further configured to determine the ciphertext message 50 by concatenating the ciphertext blocks 51 ($c_1, c_2, \ldots c_i$) of all the rounds in an orderly manner, in particular in the aforementioned orderly manner, so as to keep respective positions between the blocks 11 within the plaintext message 10 and the correspondent blocks 51 within the ciphertext message 50.

The processing unit 64 being further configured to reload the register 23 with the last computed ciphertext block 51 and to apply the incrementing function (f) to the counter data 22 in order to increment it before performing only the first two steps of the round. Then, the processing unit 64 is configured to compute the global tag 52 by a second operation OP2 using, e.g. from the memory 66, all the computed authentication local tags (32) as operands.

The interface 61 (or any other interface) is further configured to output the ciphertext message 50 and the global tag 52.

The converting operation performed by the converting unit 62 may relate to divide the plaintext message 10 into blocks 11 having the same bit length and, if any, to a padding operation applied to at least one of the two end blocks 11 of this plaintext message once divided.

The cryptographic device 60 can further include a generator 67 (or a pseudo generator) for generating an initialization vector (IV) that could be used for implementing the method according to any of the embodiment disclosed in the present description. Such a generator (or another one) could be also used for initializing the counter 25 with an initial value, typically for resetting purpose. Besides, it should be noted that the register 23, the counter 25 and, if any, the generator 67 could be located within the processing unit 64.

When acting as a first device, in particular at the sender side, the encryption device 60 is typically intended to be used for encrypting plaintext messages 10 that will be then decrypted by a decryption device 60', acting as a second device, in particular at the receiver side. Given that the decryption phase corresponds to the reverse process of the encryption phase, the electronic components that form the encryption device are identical or similar to those of the decryption device. Only the functions associated to some components of the decryption device can differ from those of the encryption device. Accordingly, the decryption device of the present invention will be also described hereafter in reference to the components of FIG. 5.

Accordingly, this second device relates to a cryptographic device 60' for implementing a block decipherment method using round repetition for providing, from a ciphertext message 50, a plaintext message 10 and a global tag 52 for authenticating the plaintext message. This cryptographic device 60' comprises:

a register 23, typically in the form of a memory (or memory cell), for receiving first data 21, an updater 25 for updating a reproducible data 22 according to an updating function f; for example, it may refer to a counter 25 for incrementing counter data 22 according to an incrementing function (f), an interface 61 for receiving at least the ciphertext message 50, a converting unit 62 for converting and preferably storing the ciphertext message 50 into a plurality of ordered ciphertext blocks 51 having all the same bit length, a processing unit 64 for successively processing each of the ciphertext blocks 51 in an orderly manner as a current ciphertext block during a round, the processing unit 64 further comprising a cryptographic unit 65, hosting a block decipherment algorithm 35, and a memory 66 comprising a single cryptographic key 34 (K).

Each round comprises:

a first step for inputting input data 20 into the block decipherment algorithm 35, this input data comprising data 21 loaded in the register 23 and a reproducible data (counter data 22), a second step for computing, within the block cipherment algorithm 35, a first output 30 by processing input data 20 using the single cryptographic key 34, the first output 30 comprising a first segment 31 and a second segment 32, the latter being defined as an authentication local tag and being stored (at least temporarily) in a memory, for instance the memory 66, a third step for computing then storing (e.g. in such a memory 66) a plaintext block 11 by performing a first operation OP1 using, as operands, the first segment 31, the current ciphertext block 51 and the second segment 32 (i.e the local tag).

As long as all the ciphertext blocks 51 have not been fully processed, the processing unit 64 being further configured to reload the register 23 with the current ciphertext block (i.e. the last computed ciphertext block) and to update the reproducible data (e.g. to increment the counter data 22 by means of the incrementing function of the counter 25) before running a new round by starting again to the first step.

The converting unit 62 being further configured to determine the plaintext message 10 by concatenating the plaintext blocks 11 of all the rounds in an orderly manner, in particular in the aforementioned orderly manner in order to keep respective positions between the blocks 11, within the plaintext message 10, and the correspondent blocks 51, within the ciphertext message 50.

The processing unit 64 being further configured to reload the register 23 with the current ciphertext block (i.e. the last ciphertext block which has been processed) and to apply the incrementing function (f) to the counter data 22 in order to increment it before performing only the first two steps of the round. Then, the processing unit 64 is configured to compute the global tag 52 by a second operation OP2 using, e.g. from the memory 66, all the computed authentication local tags (32) as operands.

Preferably, the processing unit 64 of the cryptographic device 60' is further configured to check whether the global tag 52 is identical to an authentication data provided together with the ciphertext message 50. Such an authentication data will typically be the global tag 52 that was determined during the encryption phase by the cryptographic device 60. In the case where (for a same message 50) there is a difference between the global tags 52 provided by each of the cryptographic device 60, 60', this means that the plaintext message 10 (or the ciphertext message 50) is not authentic. Accordingly, the processing unit 64 can undertake an appropriate action, for instance it may trigger a warning message, interrupt the release of the plaintext message 10 and/or it may send information as reporting data.

Of course, the interface 61 is further configured to output the plaintext message 10 once it has been restituted.

It should be noted that the cipher algorithm of the cryptographic device 60 is the same as the decipherment algorithm of the cryptographic device 60'. Indeed, such an algorithm 35 can be used for ciphering as well as for deciphering.

Besides, in view to determine the global tag 52, the memory 66 (or another memory) will be used to store all the local tags 32 or the intermediate results in the event the global tag is progressively determined during each iteration. In one embodiment, the ciphertext message 50 or the plaintext message 10 could be also determined in the same way.

The memory 66 of the cryptographic device 60, 60' can be a secure memory. In one embodiment, the components of the cryptographic device 60, 60' are comprised in a monolithic unit, so it would be not possible to physically access to the components, in particular at least to the sensitive components, without destroying the monolithic unit.

The cryptographic key 34 is use both for encryption or decryption purpose by the cryptographic device 60, 60'.

Although embodiments of the present disclosure have been described with reference to specific example embodiments, it will be evident that various modifications and changes may be made to these embodiments without departing from the broader scope of these embodiments. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived there from, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:

1. A method for encrypting a message, the method comprising:
   converting a plaintext message into a plurality of plaintext blocks, each plaintext block of the plurality of plaintext blocks having a predefined bit length;
   for each respective plaintext block of the plurality of plaintext blocks:
      inputting respective input data into a block cipher algorithm, wherein the respective input data comprise respective reproducible data and either an initialization vector or a respective previously-computed ciphertext block;
      computing, using the block cipher algorithm, a respective cryptogram by encrypting the respective input data using a cryptographic key, wherein the respective cryptogram comprises a respective first segment and a respective second segment, the respective second segment comprising a respective authentication local tag;
      performing a first sub-operation using, as inputs, a respective first operand and a respective second operand of three respective operands, wherein the three respective operands comprise: the respective first segment, the respective second segment, and the respective plaintext block of the plurality of plaintext blocks; and
      performing a second sub-operation using, as inputs, a respective third operand of the three respective operands and a respective result of the first sub-operation;
      wherein a respective result of the second sub-operation is a respective ciphertext block of a plurality of ciphertext blocks; and
   concatenating the plurality of ciphertext blocks to generate a ciphertext message.

2. The method of claim 1, further comprising padding at least one plaintext block of the plurality of plaintext blocks such that each plaintext block of the plurality of plaintext blocks has the predefined bit length.

3. The method of claim 1, further comprising:
   determining whether the respective reproducible data and either the initialization vector or the respective previously-computed ciphertext block have the same bit length; and
   responsive to determining that the respective reproducible data and either the initialization vector or the respective previously-computed ciphertext block do not have the same bit length, padding at least one of the respective reproducible data, the initialization vector, or the respective previously-computed ciphertext block.

4. The method of claim 1, wherein:
   for a first plaintext block of the plurality of plaintext blocks, the respective input data comprise respective reproducible data and the initialization vector; and
   for all other plaintext blocks of the plurality of plaintext blocks, the respective input data comprise respective reproducible data and a respective previously computed ciphertext block of the plurality of ciphertext blocks.

5. The method of claim 1, wherein the first sub-operation and the second sub-operation are both logical operations.

6. The method of claim 1, wherein the first sub-operation and the second sub-operation are both commutative operations.

7. The method of claim 1, wherein at least one of the first sub-operation or the second sub-operation is an exclusive OR (XOR) operation.

8. An apparatus for encrypting a message, the apparatus comprising:
   at least one memory; and
   at least one processor coupled to the at least one memory and configured to:
      convert a plaintext message into a plurality of plaintext blocks, each plaintext block of the plurality of plaintext blocks having a predefined bit length;
      for each respective plaintext block of the plurality of plaintext blocks:
         input respective input data into a block cipher algorithm, wherein the respective input data comprise respective reproducible data and either an initialization vector or a respective previously-computed ciphertext block;
         compute, using the block cipher algorithm, a respective cryptogram by encrypting the respective input data using a cryptographic key, wherein the respective cryptogram comprises a respective first segment and a respective second segment, the respective second segment comprising a respective authentication local tag;
         perform a first sub-operation using, as inputs, a respective first operand and a respective second operand of three respective operands, wherein the three respective operands comprise: the respective first segment, the respective second segment, and the respective plaintext block of the plurality of plaintext blocks; and
         perform a second sub-operation using, as inputs, a respective third operand of the three respective operands and a respective result of the first sub-operation;
      wherein a respective result of the second sub-operation is a respective ciphertext block of a plurality of ciphertext blocks; and
      concatenate the plurality of ciphertext blocks to generate a ciphertext message.

9. The apparatus of claim 8, wherein the at least one processor is further configured to pad at least one plaintext block of the plurality of plaintext blocks such that each plaintext block of the plurality of plaintext blocks has the predefined bit length.

10. The apparatus of claim 8, wherein the at least one processor is further configured to:
   determine whether the respective reproducible data and either the initialization vector or the respective previously-computed ciphertext block have the same bit length; and
   responsive to determining that the respective reproducible data and either the initialization vector or the respective previously-computed ciphertext block do not have the same bit length, pad at least one of the respective reproducible data, the initialization vector, or the respective previously-computed ciphertext block.

11. The apparatus of claim 8, wherein:
for a first plaintext block of the plurality of plaintext blocks, the respective input data comprise respective reproducible data and the initialization vector; and
for all other plaintext blocks of the plurality of plaintext blocks, the respective input data comprise respective reproducible data and a respective previously-computed ciphertext block of the plurality of ciphertext blocks.

12. The apparatus of claim 8, wherein the first sub-operation and the second sub-operation are both logical operations.

13. The apparatus of claim 8, wherein the first sub-operation and the second sub-operation are both commutative operations.

14. The apparatus of claim 8, wherein at least one of the first sub-operation or the second sub-operation is an exclusive OR (XOR) operation.

15. A non-transitory computer-readable storage medium having stored thereon instructions that, when executed by at least one processor, cause the at least one processor to:
convert a plaintext message into a plurality of plaintext blocks, each plaintext block of the plurality of plaintext blocks having a predefined bit length;
for each respective plaintext block of the plurality of plaintext blocks:
input respective input data into a block cipher algorithm, wherein the respective input data comprise respective reproducible data and either an initialization vector or a respective previously-computed ciphertext block;
compute, using the block cipher algorithm, a respective cryptogram by encrypting the respective input data using a cryptographic key, wherein the respective cryptogram comprises a respective first segment and a respective second segment, the respective second segment comprising a respective authentication local tag;
perform a first sub-operation using, as inputs, a respective first operand and a respective second operand of three respective operands, wherein the three respective operands comprise: the respective first segment, the respective second segment, and the respective plaintext block of the plurality of plaintext blocks; and
perform a second sub-operation using, as inputs, a respective third operand of the three respective operands and a respective result of the first sub-operation;
wherein a respective result of the second sub-operation is a respective ciphertext block of a plurality of ciphertext blocks; and
concatenate the plurality of ciphertext blocks to generate a ciphertext message.

16. The non-transitory computer-readable storage medium of claim 15, wherein the instructions, when executed by the at least one processor, cause the at least one processor to pad at least one plaintext block of the plurality of plaintext blocks such that each plaintext block of the plurality of plaintext blocks has the predefined bit length.

17. The non-transitory computer-readable storage medium of claim 15, wherein the instructions, when executed by the at least one processor, cause the at least one processor to:
determine whether the respective reproducible data and either the initialization vector or the respective previously-computed ciphertext block have the same bit length; and
responsive to determining that the respective reproducible data and either the initialization vector or the respective previously-computed ciphertext block do not have the same bit length, pad at least one of the respective reproducible data, the initialization vector, or the respective previously-computed ciphertext block.

18. The non-transitory computer-readable storage medium of claim 15, wherein:
for a first plaintext block of the plurality of plaintext blocks, the respective input data comprise respective reproducible data and the initialization vector; and
for all other plaintext blocks of the plurality of plaintext blocks, the respective input data comprise respective reproducible data and a respective previously computed ciphertext block of the plurality of ciphertext blocks.

19. The non-transitory computer-readable storage medium of claim 15, wherein the first sub-operation and the second sub-operation are both logical operations.

20. The non-transitory computer-readable storage medium of claim 15, wherein the first sub-operation and the second sub-operation are both commutative operations.

* * * * *